United States Patent [19]

Konishikawa

[11] Patent Number: 5,337,374
[45] Date of Patent: Aug. 9, 1994

[54] DISK DRIVE APPARATUS

[75] Inventor: Kaoru Konishikawa, Hanamaki, Japan

[73] Assignee: Matsushita Electric Industrial Co., Ltd., Osaka, Japan

[21] Appl. No.: 902,690

[22] Filed: Jun. 23, 1992

[30] Foreign Application Priority Data

Jul. 4, 1991 [JP] Japan .................................. 3-164287

[51] Int. Cl.$^5$ .................................. F16C 32/06
[52] U.S. Cl. .................................. 384/107; 384/100; 360/99.08; 360/99.04; 360/99.07
[58] Field of Search ............... 360/99.08, 98.07, 99.04; 384/100, 107, 108, 109, 113, 114, 118, 120, 121

[56] References Cited

U.S. PATENT DOCUMENTS

| 3,449,028 | 6/1969 | Dehart De Hart | 384/120 |
| 3,874,749 | 4/1975 | Maniak | 384/109 |
| 4,547,081 | 10/1985 | Tanaka et al. | 384/121 |
| 4,798,476 | 1/1989 | Sakatani et al. | 384/108 |
| 4,800,453 | 1/1989 | Okauchi et al. | 360/99.08 |
| 5,054,015 | 10/1991 | Tsukihashi et al. | 360/99.08 |

FOREIGN PATENT DOCUMENTS

| 3203126 | 8/1983 | Fed. Rep. of Germany | 384/120 |
| 153913 | 7/1991 | Japan | 384/120 |

*Primary Examiner*—John T. Kwon
*Attorney, Agent, or Firm*—Mason, Fenwick & Lawrence

[57] ABSTRACT

A disk drive apparatus having a thick and simple structure with manufactured at low cost, and a bearing device having a thick structure, whose shaft deflection is small, and which is high in vibration and impact strength, and manufactured at low cost. The disk drive apparatus comprises a stator provided on a metal based printed circuit board, a shaft supported by a bearing device which is securely fixed by an attaching means of the stator, with the shaft being assembled with a magnet, a rotor yoke and the like. With this structure, the number of component parts can be decreased, and since a die therefor is not necessary, the cost for manufacturing it can be eliminated. Therefore, the disk drive apparatus is advantageous in manufacture. The bearing device for supporting a shaft through lubricating oil comprises a bearing body having at least one groove on an inner peripheral surface and grooves formed on both sides thereof with a smaller depth than the groove a thrust receiving portion provided at the bottom of the bearing body, and at least one vent hole. With this structure, the bearing device can be reduced in thickness without a metal bush and a ball bearing. Also, owing to the pumping effect of the shaft, the grooves and the lubricating oil, a film of the lubricating oil is formed around the shaft so that the shaft deflection can be suppressed.

6 Claims, 5 Drawing Sheets

DISK DRIVE APPARATUS

BACKGROUND OF THE INVENTION

1. Industrial Field of the Invention

The present invention relates to a disk drive apparatus, e.g. a floppy disk system, a hard disk system or the like, used as an external memory or the like for a computer, and it also relates to a bearing device for use in such the disk drive apparatus.

2. RELATED ART

Referring to FIG. 8, in the structure of a conventional disk drive apparatus, a substrate 4, a stator 3, a metal bush 13 and a bearing unit 12 are attached on an aluminum die-cast base 11. Further, a magnet 5, a rotor yoke 6, a hub magnet 7, a hub 8 and a shaft 9 are assembled, and the shaft 9 is provided in the metal bush 13 and the bearing unit 12. Thus, the direct drive motor is constituted.

In the conventional disk drive apparatus, however, the metal based printed circuit board 4 which can be subjected to magnetization required for the motor is provided on the aluminum die-cast base 11 serving as a casing, and also, the bearing unit 12 is closely fitted in a bearing housing which is integrally formed with or securely connected on the aluminum die-cast base 11 so as to fix the shaft 9. Consequently, it is difficult to decrease such an apparatus in thickness and size. Moreover, the conventional apparatus involves a problem of difficulty in simplification of the machining procedure, and an economic problem of expenses for a die for aluminum die casting, finish machining and so forth.

A bearing device 10 itself can not be reduced in thickness since it comprises the metal bush 13, the bearing unit 12 and so forth so that a height h from the bottom surface of the base 11 of the bearing device 10 to the hub 8 is 10 mm or more. Further, as shown in FIG. 9, deflection of the shaft 9 is as large as 10 $\mu$m at minimum to 20 $\mu$m at maximum, and therefore, the bearing device 10 involves a problem that high accuracy in supporting the shaft 9 can not be obtained.

Besides, the number of component parts such as the metal bush 13 and the bearing unit 12 is so large that the cost is high, and the bearing unit 12 involves a problem that it is low in vibration and impact strength.

SUMMARY OF THE INVENTION

The present invention has been achieved to solve the above-described problems. It is therefore an object of the invention to provide a disk drive apparatus which is reduced in thickness, simplified in structure, and manufactured at low cost.

Another object of the invention is to provide a bearing device which is reduced in thickness, whose shaft deflection is small, and which is high in vibration and impact strength, and manufactured at low cost.

A further object of the invention is to provide a bearing device whose shaft deflection is suppressed to the minimum.

A still other object of the invention is to provide a structure in which a thinner and more compact bearing device can be more easily mounted on a disk drive apparatus which might be increased in thickness with a conventionally employed combination of a substrate and a bearing device.

In order to attain the primary object, the invention provides a disk drive apparatus in which a stator including a coil stator is provided on a metal based printed circuit board, and a shaft is supported by a bearing device which is securely fixed by a bearing device attaching means which is included in the stator, with the shaft being assembled with a magnet, a rotor yoke, a hub magnet and a hub. Thus, the direct drive motor is constituted.

In the structure of this disk drive apparatus according to the invention, the stator is directly attached on the metal based printed circuit board instead of an aluminum die-cast base, and the bearing unit supporting means is provided on the stator in order to fix the bearing unit securely instead of using a bearing housing so that the shaft is supported by the fixed bearing unit.

Since the conventional aluminum die-cast base and the conventional bearing housing are not required, the number of component parts can be decreased, and since a die for component parts made of aluminum is not necessary, the cost for manufacturing it can be eliminated. Also, the step of assembling an aluminum die-cast base and a metal based printed circuit board and the steps of finish machining of a housing and the like can be eliminated and the structure can be simplified. Therefore, the disk drive apparatus of the invention is easy to assemble and advantageous in its manufacture. Above all, with this structure, the stator assembled with the bearing unit can be arranged to have a thickness as small as a thickness of the bearing unit eventually, and consequently, the whole disk drive apparatus itself can be reduced in thickness. Thus, the invention takes remarkable effects in improving compactness of products.

Moreover, in order to attain the secondary object, the present invention provides a bearing device comprising at least one groove formed on the inner peripheral surface of a bearing body for supporting a shaft through lubricating oil; grooves having a smaller depth than the groove and formed on both sides of the groove; at least one vent hole; and, a thrust receiving portion provided at the bottom of the bearing body.

In order to attain the third object, the invention provides a bearing device further comprising a recessed portion formed in a central portion of the upper surface of the thrust receiving portion.

Furthermore, in order to attain the fourth object, the invention provides a disk drive apparatus comprising a structure wherein a bearing body of a bearing device is directly provided on a metal based printed circuit board, and a stator is attached to the outer periphery of the bearing body, the bearing body having an inner peripheral surface on which at least one groove is formed and grooves having a smaller depth than the groove are formed on both sides of the groove, the bearing device including a thrust receiving portion which is provided at the bottom of the bearing body and at least one vent hole, the bearing body having the inner surface to which lubricating oil is applied, so that a shaft, with which a magnet, a rotor yoke, a hub magnet and a hub are assembled in advance, is provided in the bearing body.

Moreover, in the structure of the bearing device according to the invention in which a metal bush and a ball bearing are not provided, the height of the bearing body can be decreased, and therefore, the bearing device can be reduced in thickness. Thus, the disk drive apparatus itself can be reduced in thickness. Also, owing to the pumping effect of the shaft, a plurality of grooves on the inner periphery of the bearing body and the lubricating oil, the shaft deflection can be decreased.

Furthermore, the cost reduction can be effected by decreasing the number of component parts, and since no ball bearing is provided in this device, the vibration and impact strength can be improved.

Besides, in such a bearing device, the recessed portion, which is formed on the thrust receiving portion, serves to sustain the lower end of the shaft so as to prevent its deflection. Thus, the deflection of the shaft can be suppressed to the minimum.

In addition, the bearing body is directly attached on the metal based printed circuit board so as to simplify the structure and to facilitate the installation in comparison with the conventional example. Thus, the thickness of the bearing device can be decreased so as to improve compactness of the product, while effectively reducing the cost.

DETAILED DESCRIPTION OF THE PREFERRED EMBODIMENTS

Figure 1:
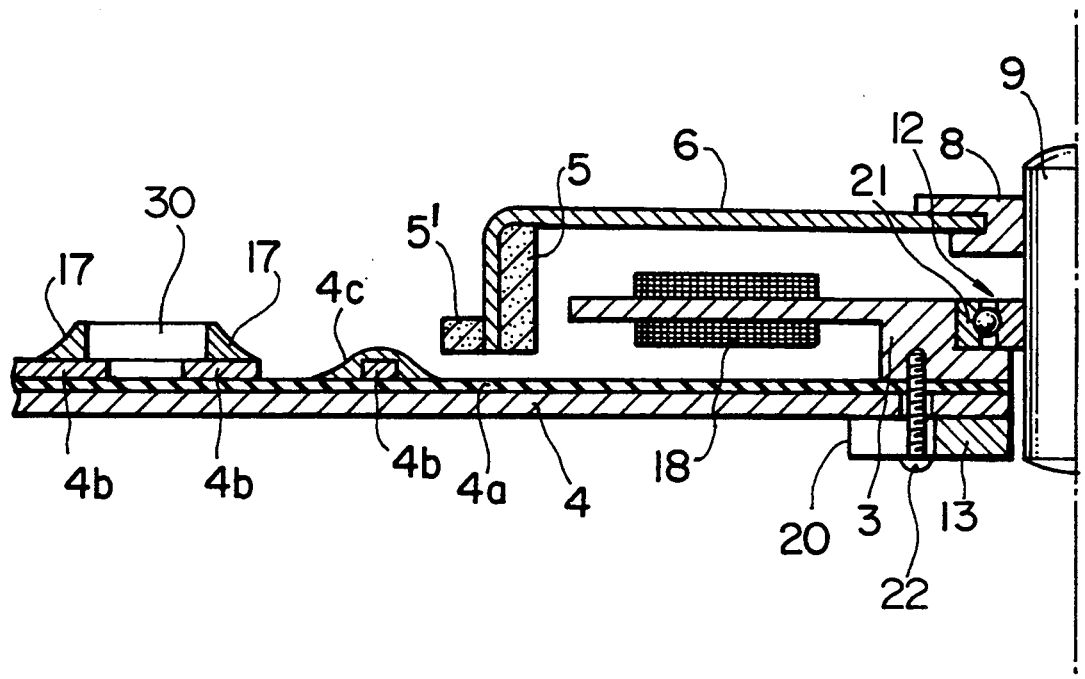
FIG. 1 is a partial sectional view showing a disk drive apparatus according to a first embodiment of the present invention.

Embodiments of the present invention will be hereinafter described with reference to the attached drawings. It should be noted that the same component parts as those of the conventional example are denoted by common reference numerals.

FIG. 1 shows a first embodiment according to the invention. A stator 3 including a coil stator 18 is fastened, by a screw-fastener 22, on a metal based printed circuit board assembly comprising a metal based printed circuit board (a steel plate) 4, an insulating layer 4a and so forth. A bearing unit 12 is press-fitted in a central opening of the stator 3, and the bearing unit 12 supports a shaft 9. A rotor 6 including a main magnet 5 and an FG (Frequency Gauge) magnet 5' is attached to the shaft 9 through a hub 8. Thus, the direct drive motor is constituted.

Figure 8:
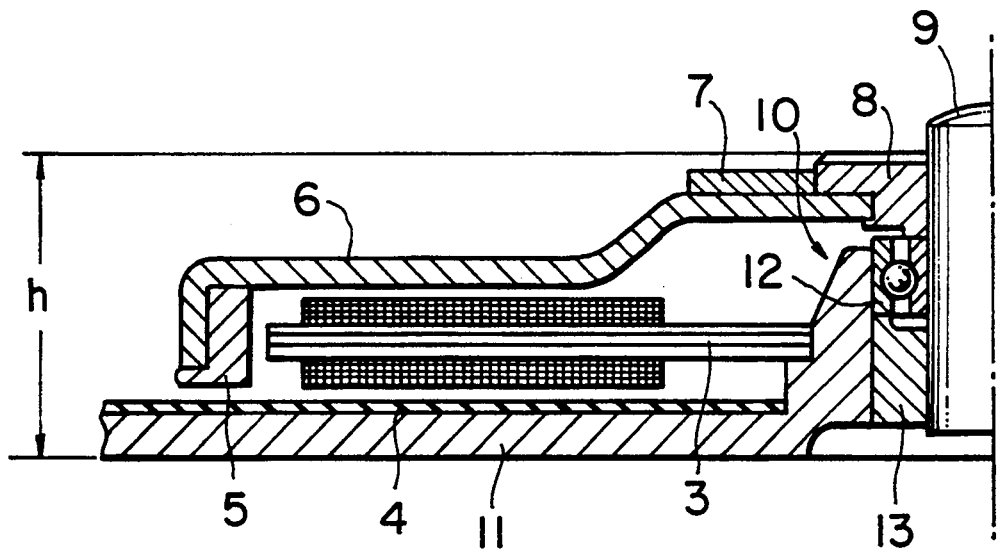
FIG. 8 is a partial sectional view of a conventional disk drive apparatus.
Figure 9:
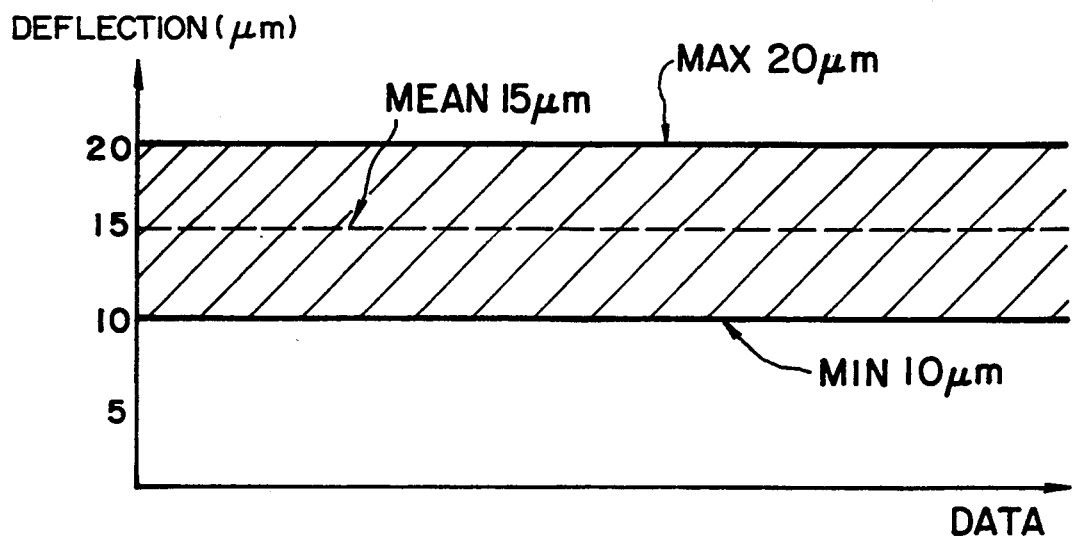
FIG. 9 is a graph showing data of actual measurement of deflection of a shaft of the bearing device shown in FIG. 8.

A conventional bearing is employed as a bearing device of the first embodiment. In this embodiment, it should be particularly noted that not only the aluminum die-cast base 11 but also the bearing housing 19 which has conventionally been used for fixing the bearing unit, as shown in FIG. 8, is eliminated from the component parts, and that the steel plate 4 is used as a metal based printed circuit board instead of the aluminum die-cast base 11 while the bearing housing 19 is replaced by the stator 3 with the bearing unit 12 being press-fitted in the central portion thereof.

In consequence, the disk drive apparatus can be reduced in thickness by omitting the aluminum die-cast base 11. Moreover, since the bearing unit is supported by press-fitting it in the stator 3 instead of using the bearing housing 19, this portion of the apparatus can be made more compact than that of the conventional example.

A metal bush 13 and its housing 20 for preventing clatter or deflection of the shaft 9 are described in the embodiment of FIG. 1. However, an additional metal bush may be provided on another side of the bearing unit 12 so as to prevent deflection of the shaft 9 more efficiently.

In order to decrease the thickness of this disk drive apparatus still more, the stator 3 may be arranged to support the bearing unit 12 only by the outer peripheral surface of an outer ring 21 of the bearing unit 12.

In this manner, the metal substrate and the conventional bearing device are assembled directly, and consequently, the number of machining steps as well as the number of component parts can be decreased less than that of the conventional example assembled with the aluminum die-cast base. This is advantageous in the manufacture of the apparatus. The first embodiment is also advantageous in that it is easy to assemble, and that it can be subjected to inspection immediately after the assembling step.

Figure 2:
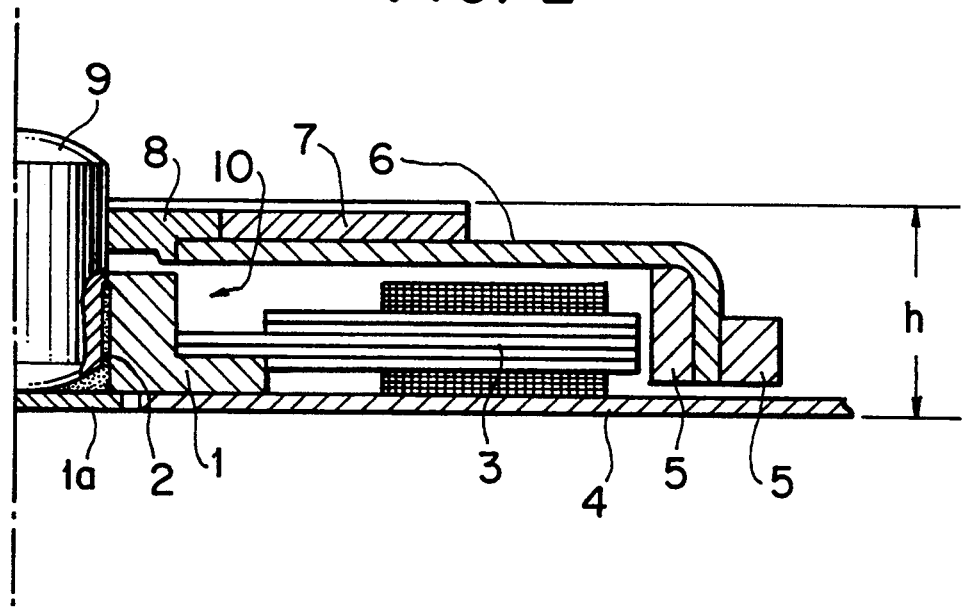
FIG. 2 is a partial sectional view of a disk drive apparatus including a bearing device according to a second embodiment of the invention.

FIG. 2 is a partial sectional view of a disk drive apparatus including a bearing device according to a second embodiment of the invention. In this figure, a bearing body 1 of the bearing device is provided on a metal based printed circuit board 4, and a stator 3 is attached to the bearing body 1. A magnet 5, a rotor yoke 6, a hub magnet 7, a hub 8 and a shaft 9 are assembled in advance, and the shaft 9 is provided in the bearing body 1 having an inner surface to which lubricating oil is applied. Thus, the direct drive motor is constituted.

Figure 3:
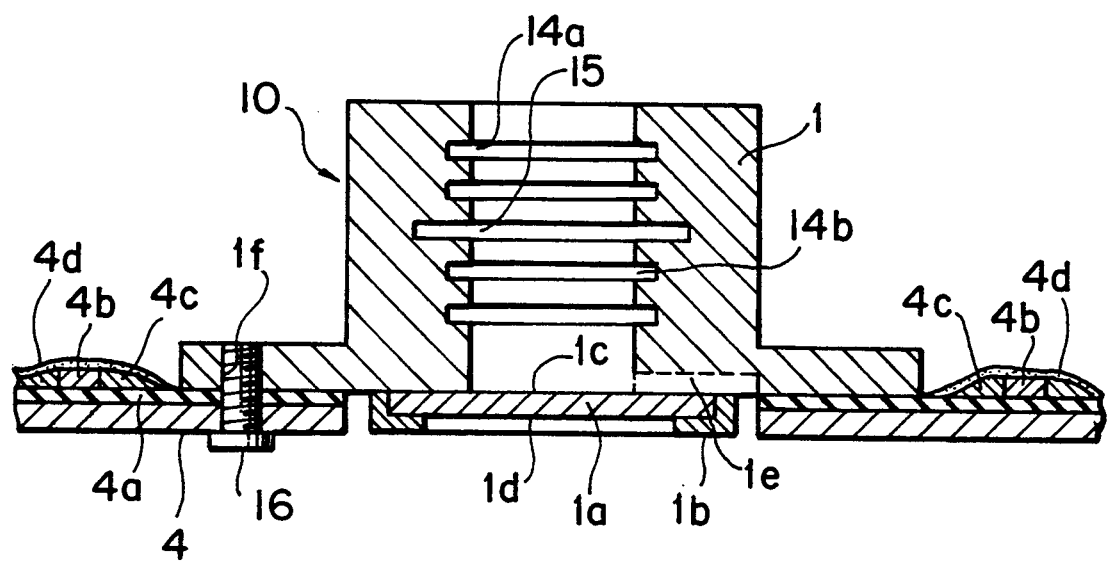
FIG. 3 is a partial enlarged sectional view of the bearing device shown in FIG. 2.

FIG. 3 is a partial sectional view of the bearing device 10 according to the invention. A copper foil pattern 4b, a solder resist 4c and a preflux 4d are provided on an insulating layer 4a on the metal based printed circuit board 4. The bearing body 1 is fastened on the metal based printed circuit board 4 by tightening a screw-fastener 16 in a screw hole 1f of the bearing body 1.

A groove 15 is formed in a central portion of the inner peripheral surface of the bearing body 1 in such a manner that it extends along this inner peripheral surface, and grooves 14a and 14b having a smaller depth than the groove 15 are formed above and below the groove 15, respectively. A vent hole 1e is formed at the bottom of the bearing body 1 where a thrust receiving portion 1a is further attached by a caulking portion 1b. The upper surface 1c of this thrust receiving portion 1a is formed to have a facial roughness of 1 s or less.

Figure 4:
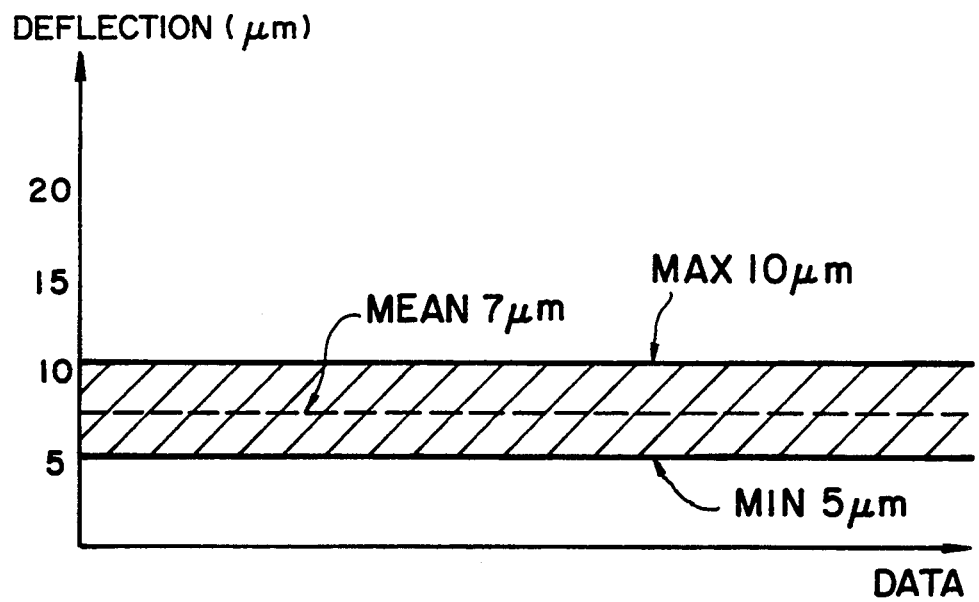
FIG. 4 is a graph showing data of actual measurement of deflection of a shaft of the bearing device shown in FIG. 2.

In the bearing device 10 of the above-described structure, when the shaft 9 is rotated, a film of the lubricating oil 2 is formed around the shaft 9 owing to the pumping effect of the shaft 9, the grooves 15, 14a and 14b and the lubricating oil 2, thereby decreasing the deflection of the shaft 9. According to data of actual measurement shown in FIG. 4, the deflection of the shaft 9 is 5 $\mu$m at minimum and 10 $\mu$m at maximum, and suppressed to almost half the deflection of the conventional example, thus contributing to high accuracy in supporting the shaft.

A combination of the bearing body 1 of the bearing device 10 according to the invention with the lubricating oil 2 and the shaft 9 constitutes a hydraulic bearing without a metal bush and a bearing so that a height h of the bearing body 1 can be decreased. Therefore, the bearing device 10 can be reduced in thickness. Moreover, the cost reduction can be effected by decreasing the number of component parts.

Furthermore, since no bearing is provided in this case, the vibration and impact strength can be improved.

According to this embodiment, as described above, the groove 15 is formed in the central portion of the inner peripheral surface of the bearing body 1 which supports the shaft 9 through the lubricating oil 2, which groove 15 extends along this inner peripheral surface, and the grooves 14a and 14b having a smaller depth than the groove 15 are formed above and below the groove 15, respectively. Further, the thrust receiving portion 1a and the vent hole 1 being provided at the bottom of the bearing body 1. With this structure, a film of the lubricating oil 2 is formed around the shaft 9 owing to the pumping effect of the shaft 9, a plurality of grooves 15, 14a and 14b of the bearing body 1 and the lubricating oil 2, and consequently, the shaft deflection can be suppressed to improve the accuracy in supporting the shaft. Also, since a bearing and the like are not used in this embodiment, the bearing device 10 can be reduced in thickness. Further, this embodiment takes effects in improving the vibration and impact strength and achieving the cost reduction.

Figure 5:
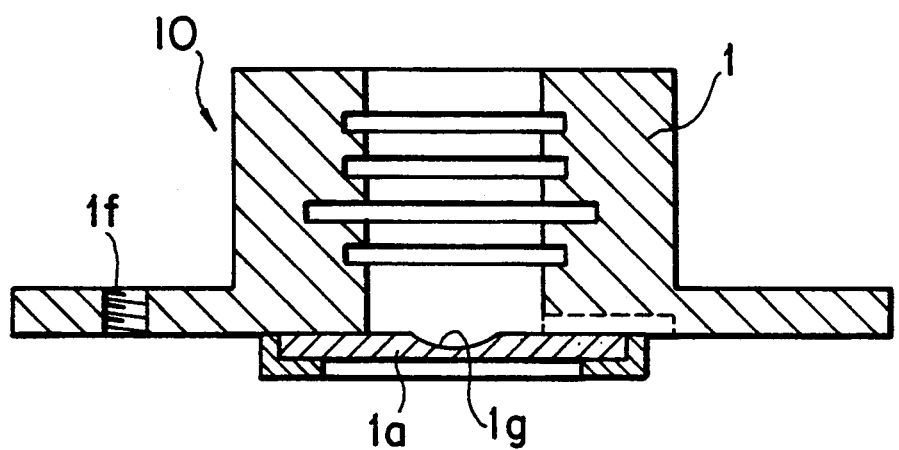
FIG. 5 is a partial enlarged sectional view of a bearing device according to a third embodiment of the invention.

FIG. 5 is a partial enlarged sectional view of a bearing device 10 according to a third embodiment of the invention. It is different from the structure shown in FIG. 3 in that a recessed portion 1g is formed substantially in the center of an upper surface 1c of a thrust receiving portion 1a.

Figure 6:
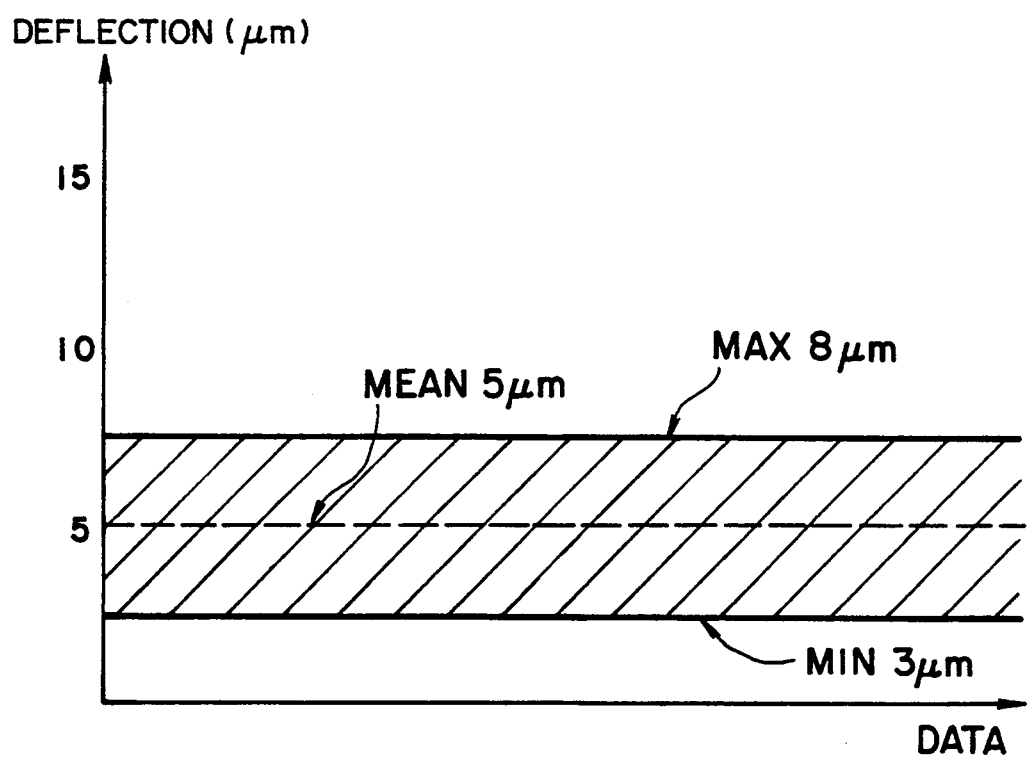
FIG. 6 is a graph showing data of actual measurement of deflection of a shaft of the bearing device shown in FIG. 5.

This recessed portion 1g sustains the lower end of a shaft 9 in order to prevent deflection of the shaft 9. According to data of actual measurement shown in FIG. 6, the deflection of the shaft 9 is 3 μm at minimum and 8 μm at maximum, further contributing to high accuracy in supporting the shaft.

According to this embodiment, the recessed portion 1g, which is formed in the center of the upper surface 1c of the thrust receiving portion 1a, serves to sustain the lower end of the shaft 9 so as to prevent its deflection. Thus, the deflection of the shaft 9 can be suppressed to the minimum, thereby contributing to high accuracy in supporting the shaft.

Figure 7:
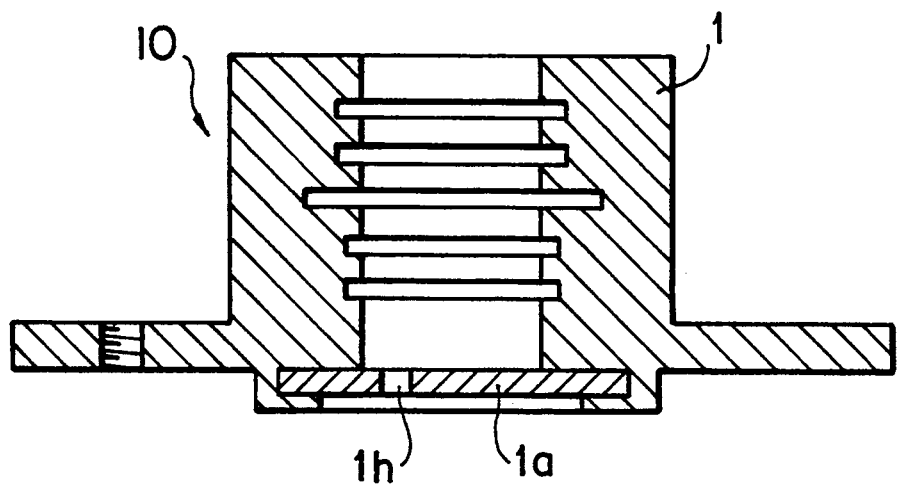
FIG. 7 is a partial enlarged sectional view of a bearing device according to a fourth embodiment of the invention.

FIG. 7 is a partial enlarged sectional view of a bearing device 10 according to a fourth embodiment of the invention. It is different from the structure shown in FIG. 3 in that a vent hole 1h is bored through a thrust receiving portion 1a.

Since this vent hole 1h is bored by pressing, the machining cost can be reduced in comparison with mechanical machining or the like for the vent hole 1e shown in FIG. 3.

According to this embodiment, the vent hole 1h is bored through the thrust receiving portion 1a by pressing so that the cost reduction can be achieved.

In the present invention, as obviously understood from the above-described embodiments, at least one groove is formed on the inner peripheral surface of the bearing body for supporting the shaft through lubricating oil, and grooves having a smaller depth than the groove are formed on both sides of the groove, with the thrust receiving portion at the bottom of the bearing body and at least one vent hole being provided. In consequence, the bearing device for which a metal bush and a ball bearing are not used can be reduced in thickness, and also, owing to the pumping effect of the shaft, a plurality of grooves in the bearing body and the lubricating oil, a film of the lubricating oil is formed around the shaft so that the shaft deflection can be suppressed to improve the accuracy in supporting the shaft. Further, especially when no ball bearing is provided in the bearing device, the vibration resistance and the impact resistance can be improved, and the cost reduction can be achieved by reducing the number of component parts.

Moreover, the recessed portion is formed on the thrust receiving portion in the bearing device of the invention so that the shaft deflection can be prevented to improve the accuracy in supporting the shaft. Besides, the vent hole is bored through the thrust receiving portion by pressing, and thus, the cost reduction can be achieved.

Furthermore, since the above-described bearing device of the invention is directly attached on the metal substrate, the conventional aluminum die-cast base and the conventional bearing housing made of aluminum are not required, thereby largely simplifying the structure and installation of the bearing device. Thus, a product whose overall thickness is small can be obtained, and the number of component parts can be decreased. Without expenses for the die, machining and the like for component parts made of aluminum, the cost can be further reduced.

In addition, since the bearing device directly attached on the metal based printed circuit board and not requiring the aluminum die-cast base and the like can be reduced in thickness, the disk drive apparatus of the invention can be made more compact than the conventional disk drive apparatus, while effectively reducing the cost.

What is claimed is:

1. A bearing device for supporting a shaft through lubricating oil, comprising:
    a) a bearing body having an inner surface on which are formed:
       1) at least one first groove; and
       2) further grooves, formed on both sides of the at least one first groove, and having a smaller depth than a depth of the at least one first groove; and
    b) a thrust receiving portion, disposed at a bottom of the bearing body.

2. The bearing device of claim 1, wherein the thrust receiving portion includes:
    an upper surface having a central portion having a recess.

3. The bearing device of claim 1, wherein the thrust receiving portion includes:
    a through hole for use as a vent hole.

4. The bearing device of claim 1, further comprising:
    a vent hole.

5. A disk drive apparatus comprising:
    a) a bearing device including:
       1) a bearing body, directly mounted on a metal-based printed circuit board, and having an inner surface on which are formed:
          i) at least one first groove; and ii) further grooves, formed on both sides of the at least one first groove, and having a smaller depth than a depth of the at least one first groove; and 2) a stator attached to an outer periphery of the bearing body; and 3) a thrust receiving portion disposed at a bottom of the bearing body;

b) a rotary shaft, incorporated in the bearing body, and having a surface to which lubricating oil is applied;

c) a rotor, attached to the rotary shaft, and having a magnet; and d) a stator coil, attached to the stator;

wherein the rotor and the stator are arranged to function as a motor.

6. The disk device of claim 5, further comprising:
a vent hole.

* * * * *